March 25, 1969  K. A. STETSON ET AL  3,434,339
HOLOGRAPHIC METHOD AND APPARATUS FOR
ACOUSTICAL FIELD RECORDING
Filed Sept. 22, 1966  Sheet 1 of 2

INVENTORS
KARL A. STETSON
HERBERT A. ELION
BY
Kenway, Jenney & Hildreth
ATTORNEYS

INVENTORS
KARL A. STETSON
HERBERT A. ELION

United States Patent Office 3,434,339
Patented Mar. 25, 1969

3,434,339
HOLOGRAPHIC METHOD AND APPARATUS FOR ACOUSTICAL FIELD RECORDING
Karl A. Stetson, West Acton, and Herbert A. Elion, Wellesley Hills, Mass., assignors to GCA Corporation, Bedford, Mass., a corporation of Delaware
Filed Sept. 22, 1966, Ser. No. 581,339
Int. Cl. G01n 9/24
U.S. Cl. 73—67.6        8 Claims

ABSTRACT OF THE DISCLOSURE

A method and apparatus for recording acoustical fields and especially an acoustic field due to an acoustic wave transmitted through a test object. The acoustic wave strikes a vibratable light reflecting diaphragm. A laser beam reflects from the diaphragm onto a photographic plate and a second laser beam maintained at a frequency differing from that of the first beam by a frequency equal to the acoustic frequency also impinges on the plate to form a hologram.

---

Our invention relates to information processing, and particularly to a novel method and apparatus for recording acoustical fields.

High frequency sound energy has found many applications, particularly in the field of non-destructive testing and measurement. In the use and adjustment of high frequency sound generators, and in studying objects excited by such generators in terms of their sound transmitting and reflecting properties, a knowledge of the amplitude and phase distribution of the sonic wavefront at one or more planes in a region of interest is frequently desirable. Such knowledge makes it possible, at least in theory, to deduce the properties of a region through which the wavefront has passed, such as the interior of an object impermeable to light. The difficulty and labor involved in reproducing the characteristics of an object from information of this kind is determined by the form in which the information is presented. A most useful transformation of information about the phase and amplitude distribution of a wavefront at a plane is possible, for optical wavefronts that have permeated translucent objects; an efficient optical lens is placed in the path of the wavefront and focussed, as on a viewing screen or a photographic plate, to produce an optical image of the object. However, acoustical images are not so readily formed, and if formed, are not easily interpreted. And, while acoustic "lenses" have been constructed, those presently available are exceedingly inefficient.

If an optical wavefront geometrically similar to an acoustic wavefront could be produced, optical apparatus could be employed to transform the optical wavefront into an image of an object traversed by the acoustic wavefront, without the losses inherent in the use of acoustical lenses, and with a concomitant increase in intelligibility of the resultant image. Accordingly, it is a first object of our invention to facilitate the preparation of an optical wavefront corresponding in amplitude and phase distribution to the amplitude and phase distribution of a sonic wavefront. The ultimate object of our invention is to simplify the preparation and recording of optical images of regions impermeable to light.

Briefly, the above and other objects of our invention are attained by placing a highly compliant diaphragm, immersed in a transparent fluid, in the plane at which the sonic wavefront is to be examined. A hologram of coherent light reflecting from the diaphragm is then made, by a novel holographic process of our invention, in which the optical frequency of the light reflected from the diaphragm is offset relative to the optical frequency of the reference beam by an amount equal to the sonic frequency of the sound energy impinging on the diaphragm. The hologram so prepared, when illuminated by monochromatic, coherent light at the proper angle, will produce an optical wavefront corresponding to the sonic wavefront at the diaphragm. The wavefront so produced can be operated on to produce an image that can be viewed directly, or recorded in any convenient manner, as by a photographic process.

The method and apparatus of our invention will best be understood in the light of the following detailed description, together with the accompanying drawings.

Figures 1, 2:
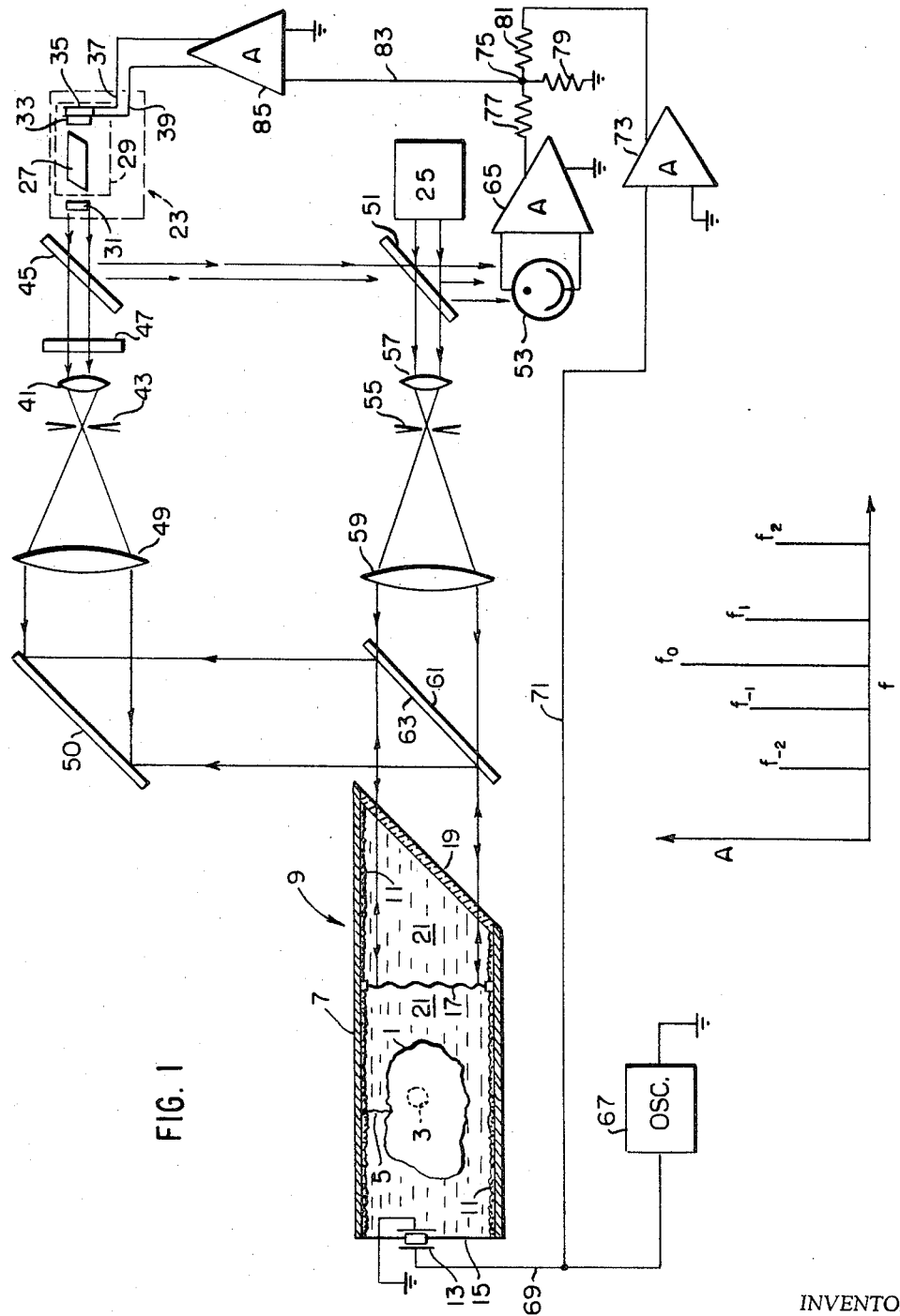
FIG. 1 is a schematic diagram, with parts shown in cross-section, of apparatus in accordance with our invention.
FIG. 2 is a graph of the frequency distribution of an optical signal produced by the apparatus of FIG. 1.

In FIG. 1, we have shown apparatus for examining an object 1, as for singularities such as an internal discontinuity 3. The object 1 is suspended in any convenient manner, as by a wire 5, from an upper wall 7 of a housing generally designated as 9.

The inner sides of the housing 9 are lined with any suitable conventional sound absorbing material 11, such as sheet cork or the like, to prevent acoustic reflections. A suitable constant frequency sound generator, here shown as a piezoelectric crystal 13, is mounted in one end of the housing 9, as by attachment to a rigid diaphragm 15 of sheet metal or the like.

Intermediate the ends of the housing 9 is a thin, highly compliant diaphragm 17 of rubber, polyvinyl chloride, poly (ethylene-glycol terephthalate), or the like. The diaphragm is preferably a film on the order of 0.001 inch thick, and is preferably coated with a thin highly reflective layer of metal or the like, on the surface away from the object 1 (on the right side in FIG. 1). The reflective coating may be applied by any conventional process, as by condensation of an evaporated metal, electrochemical deposition, or the like. In practice, the diaphragm 17 would be stretched smooth and flat in the absence of an acoustic field in the housing 9, but has been illustrated by a wavy line to suggest its compliance, and therefore low inertia and substantial freedom from resonant modes.

The housing 9 terminates in a plane at 45 degrees to the longitudinal axis of the housing, and is sealed by a transparent plate 19, of glass or the like. The housing is filled, on both sides of the diaphragm 17, by a transparent fluid 21, such as water or the like, having a high specific acoustic impedance as compared with air.

It will be apparent that sound energy emitted from the generator 13 will be propagated in the housing 9, permeating the object 1 and causing the compliant diaphragm 17 to assume a form corresponding at any instant to the phase and amplitude distribution of the sonic wavefront essentially at the plane of the undisturbed diaphragm. The sonic wavefront beyond the diaphragm will be reflected upwardly by the plate 19, and will be absorbed by the sound absorbent material 11 on the upper wall 7 of the housing 9.

The apparatus of FIG. 1 further comprises means for making a modified hologram of the light reflected from the surface of the diaphragm 17. The holographic apparatus comprises first and second sources of monochromatic, coherent light of approximately the same optical frequency, here shown schematically as a pair of conventional optical lasers 23 and 25.

At least one of the lasers 23 and 25 is provided with conventional means for optical frequency adjustment. As here schematically shown, the laser 23 is provided with means for adjusting the length of its resonant cavity for optical frequency control, as by adjustment of a piezoelectric crystal secured to the laser to compress the back reflecting surface and thereby change the length of the resonant cavity. Specifically, the lasers 23 and 25 may be variable frequency, temperature controlled lasers such as the Spectra-Physics model 119, sold by Spectra-Physics, Inc., 1255 Terra Bella Ave., Mount View, Calif. As schematically indicated for the laser 23, such lasers comprise a plasma tube 27 located in a temperature control chamber 29 between a half silvered front mirror 31 and a rear mirror 33. The spacing between the mirrors 31 and 33 determines the length of the optical resonant cavity, and therefore the frequency of the light emitted by the laser. As schematically indicated, the back mirror 33 is mounted on a piezoelectric chip 35 having leads 37 and 39 connected to an external jack. A voltage applied to the leads 37 and 39 will thus cause a small movement of the rear mirror 33, allowing the output frequency to be adjusted.

A lens schematically indicated at 41 is mounted in the path of the beam from the front mirror 31 of the laser 23 to focus the beam to a point at a pinhole aperture formed in a suitable mask 43, to simulate a spherically divergent point source. Between the laser 23 and the laser 25 are placed a glass plate 45, at 45 degrees to the axis of the beam from the laser 23, and an attenuating plate 47, of glass or the like, normal to the beam. The purpose of the plate 45 is to produce a small signal beam, at 90 degrees to the main beam, by reflection downwardly from the back surface of the plate 45. The plate 47 is selected to attenuate the beam by an amount sufficient to match it to the subject beam produced by the laser 25 in a manner to be described.

Light from the pinhole aperture 43 is collimated by a lens schematically indicated at 49, and is directed onto a holographic plate 50, such as a conventional high resolution photographic film or plate. The plate 50 is preferably mounted in a conventional plateholder with a dark slide, not shown, so that the emulsion is unexposed until the apparatus is arranged for a recording.

The beam from the laser 23 acts as a reference beam for holographic purposes. A subject beam is produced at the front surface of the laser 25.

The beam from the laser 25 first passes through a glass plate 51 at 45 degrees to the axis of the beam. A small portion of the beam is reflected downwardly from the back surface of the plate 51, and is combined with that portion of the signal beam reflected downwardly by the back surface of the plate 45 and passing through the plate 51. The two signal beams thus formed fall on a photomultiplier tube 53, for purposes to be described.

The main portion of emergent beam from the laser 25 passes through the plate 51 and is focussed to a point at a pinhole in a mask 55 by a lens schematically indicated at 57. Light from the aperture in the mask 51 is collimated by a lens schematically indicated at 59.

The collimated beam from the lens 59 is directed onto a half-silvered mirror 61 at 45 degrees to the longitudinal axis of the beam. The surface 63 of the mirror 61 is half-silvered.

Ignoring downward reflection losses and irrelevant shifts in position due to refraction, the beam from the lens 59 continues through the mirror 61, enters the housing 9 through the transparent plate 19, and is reflected from the diaphragm 17. The reflected beam then comes back through the plate 19 and is reflected upwardly onto the holographic plate 50 by the half-silvered surface 63 of the mirror 61.

It will be apparent that the light reflected from the diaphragm 17 will be phase modulated by a sonic beam exciting the diaphragm 17. Thus, referring to FIG. 2, if the beam emergent from the laser 25 has a frequency $f_0$, modulation by the sonic beam will introduce a number of sidebands at frequencies such as $f_1$, $f_{-1}$ and $f_2$, $f_{-2}$. Each such sideband above the basic frequency $f_0$ is associated with a sideband of equal amplitude and equal frequency below $f_0$. In particular, if the frequency $f_a$ of the sound generator 13 is constant, the most significant sidebands produced will be $f_1$ and $f_{-1}$, each located $f_a$ away from the base frequency $f_0$. Thus, if the laser 23 is adjusted until its frequency differs from the frequency of the laser 25 by $f_a$, and their frequency difference is locked in phase to $f_a$, a standing interference pattern will be produced on the holographic plate 50. The significance of that interference pattern will next be considered.

Figure 3:
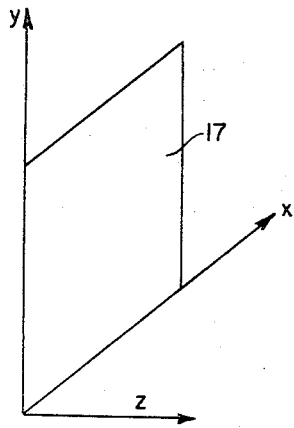
FIG. 3 is an analytical sketch of a diaphragm forming a part of the apparatus of FIG. 1.
Figure 4:
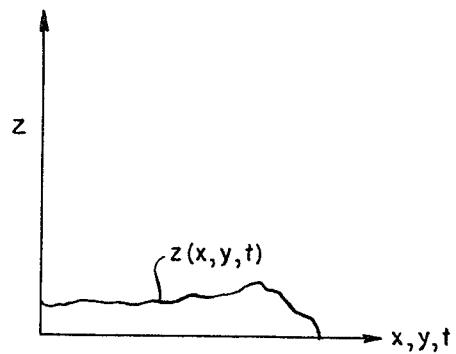
FIG. 4 is a graph illustrating the behavior of the diaphragm of FIG. 3 during operation of the apparatus of FIG. 1.

Referring to FIG. 3, assign two orthogonal coordinate axes $x$ and $y$ in the plane of the undisturbed diaphragm 17, and let local displacements of the diaphragm at any point in the $x$, $y$ plane be represented by displacements along a coordinate axis $z$ normal to $x$ and $y$, $z$ being chosen positive in the direction of propagation of sound through the housing. FIGURE 4 illustrates a typical graph of diaphragm displacement $z(x,y,t)$, where $t$ is time, in any of the planes $(z,x)$, $(z,y)$ and $(z,t)$. $z(x,y,t)$ may be expressed as (1) $\quad z = m(x,y) \cos[\omega_a t + \phi(x,y)]$ where:
$m$ is the amplitude of vibration
$\omega_a$ is the angular frequency of vibration in radians per second, and is determined by the source 13, and
$\phi$ is the phase of the vibration in radians The light wave reflected from the diaphragm 17, at the plane $z=o$, is then given by (2) $\quad E = \exp\left[\omega t + \frac{2\pi}{\lambda}(m(x,y) \cos(\omega_a t + \phi(x,y)))\right]$ where:
exp means "$e$ to the power," $e$ is the base of natural logarithms,
$\omega$ is the frequency of the impinging light beam and is given by $\omega = 2\pi f_0$ and $\lambda$ is the wavelength of the impinging light beam.

The phase modulation term in Equation (2) may be factored and expanded in a Fourier series with Bessel function coefficients to give (3)

$$E = \exp(\omega t) \sum_{n=\infty}^{\infty} i^n \left(J_n\left(\frac{2\pi}{\lambda} m(x,y)\right)\right) \exp(n(\omega_a t + \phi(x,y)))$$

wherein:
$i^2 = -1$ and $J_n$ means the $n^{th}$ order Bessel function of the first kind Each term of the series (3) may be interpreted as one of a set of fields each of which is a separate diffracted order resulting from the acoustical modulation of the diaphragm. In particular, the $J_0$ term corresponds to the $f_0$ component of the modulated beam in FIG. 2, and the $J_1$ and $J_{-1}$ terms correspond to the sidebands $f_1$ and $f_{-1}$ in FIG. 2. Consider the first order term:

(3a)

$$E_1 = \exp(\omega t) i J_1\left[\frac{2\pi}{\lambda} m(x,y)\right]\left[\exp(\omega_a t + \phi(x,y))\right]$$

For small values of $m$, the amplitude of the vibration, the value of the first order Bessel function is proportional to its argument $2\pi m/\lambda$. The geometrical phase $\phi$ is equal to the phase of the acoustical field. A two dimensional recording of the first order term (or its complementary $J_{-1}$ field) will then have a geometry equivalent to the geometry of the acoustical field. As noted above, a holographic recording of one of the first order fields may be made by causing the frequency of the laser 23 to differ from the frequency of the laser 25 by $\omega_a$, the angular frequency of the sonic source. Such a holographic recording, when illuminated by a reference beam of coherent light at the proper angle, will produce a wavefront that can be transformed into an optical image of the object 1 in the acoustical field in a manner to be described below. By double exposing a plate, one exposure being made with a first object in the sonic field and the second with a second object in the field, a recording useful in acoustic interferometry may be produced. Alternatively, recordings made in the absence of an object 1 reveal the characteristics of the source 13. Typically, using lasers having frequencies in the range of $10^{14}$ to $10^{15}$ c.p.s., acoustical frequencies in the range of $10^6$ to $10^7$ c.p.s. will produce useful recordings, although the acoustical frequencies may perhaps be extended as low as $10^5$ c.p.s. for some purposes.

Referring again to FIG. 1, in order to achieve the frequency shift and phase-locking required for a holographic recording of the acoustical field exciting the diaphragm 17, a servomechanism is provided. Reference signals having the frequencies of the lasers 23 and 25 are conveniently obtained from the main beams emergent from the lasers, by the beam-splitters comprising the plates 45 and 51 described above, and producing beams falling onto the photomultiplier tube diagrammatically shown at 53.

The photomultiplier tube 53 is provided with a rapid response phosphor, such as a conventional S-20 phosphor. Such a tube will not respond at the frequency of either laser, but will respond to the beat frequency of the two lasers to produce a signal at that frequency in a circuit schematically shown as comprising the input circuit of an amplifier 65. The amplifier 65 may include a limiter followed by a zero-crossing detector, a pulse generator, and a pulse averaging circuit, or other conventional apparatus for producing an output current or voltage proportional to the beat frequency of the lasers 23 and 25. Such apparatus is well known to those skilled in the art, and, forming no part of our invention per se, will not be further described.

Means such as a conventional electronic oscillator 67 is provided for exciting the sound generator 13 at a suitable frequency, preferably in the range of $10^5$ to $10^7$ c.p.s., over a lead 69. At the same time, the oscillator 67 supplies a signal over a lead 71 to electronic circuits schematically shown as an amplifier 73.

The amplifier 73 may comprise circuits similar to those indicated at 65 for producing an output signal proportional to the frequency of the oscillator 67 and opposite in sign to the signal from the amplifier 65. The output signals from the amplifiers 65 and 73 are supplied to a conventional summing junction 75 schematically indicated as formed at the junction of three resistors 77, 79 and 81.

The signal at the junction 75 is supplied over a lead 83 to a conventional D.C. amplifier 85 to control the polarity and amplitude of the voltage applied to the piezoelectric crystal 35. If desired, the servomechanism thus schematically illustrated may be modified in the manner known to those skilled in the art to include compensation for rate of change, acceleration and damping. However, as the details of a suitable frequency locking servomechanism are known to those skilled in the art, and, per se, do not form a part of our invention, they will not be described in detail. One suitable servomechanism for this purpose is described in February 1965 Proceedings of the I.E.E.E., on pages 165 and 166.

The output terminals of the amplifier 85 are connected to the input terminals 37 and 39 of the piezoelectric crystal 35. By that arrangement, the position of the back mirror 33 will be adjusted until the difference in frequency between the lasers 23 and 25 is equal to the frequency of the oscillator 67, and the interfering light beams on the plate 50 will be locked in phase. It will be apparent that the latter condition will be met by a sufficiently precise frequency control, as a shift in phase is equivalent to a shift in frequency.

The operation of the apparatus of FIG. 1 will be apparent to those skilled in the art from the above description. Briefly, however, assume that the lasers 23 and 25 and the oscillator 67 are in operation, and that an object 1 is in place in the housing 9. Assume that a photographic plate is at 50 with a dark slide in place. The servomechanism will function to lock the lasers 23 and 25 in frequency at a constant frequency difference equal to the frequency of the oscillator 67. When the system is stable, the dark slide is removed from the plate 50, and a holographic exposure is made. The plate 50 is then developed in the conventional manner, to reproduce a holographic image corresponding to the acoustic field on the diaphragm 17 in the form of an optical transparency.

If the hologram 50 prepared as described above was positioned as shown at 50 in FIG. 1 and illuminated by a collimated beam of coherent light, as from a laser 23 placed to the left of the plate 50 to simulate the reverse of the original reference beam, a subject beam of light would be reproduced, fall on the half-silvered mirror 61, and be reflected toward the housing 9. If the housing 9 were placed by a transparent plate having an index of refraction matching the combination of the plate 19 and the liquid 21, a three-dimensional optical image of the object 1 would be reproduced, but at a large distance from the source determined by the ratio of the wavelength of the acoustic signal produced by the crystal 13 to the wavelength of the optical signal produced by the laser 23. In order to produce an equivalent image at a more practical distance, the apparatus shown in FIG. 5 may be employed.

Figure 5:
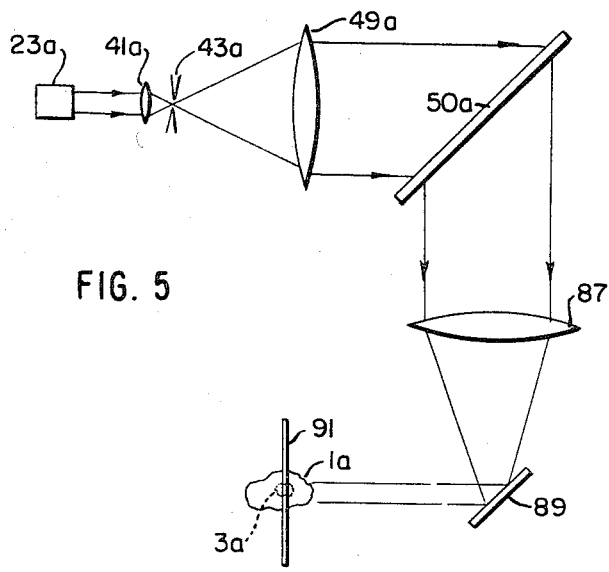
FIG. 5 is a schematic diagram of apparatus for forming and recording an optical image in accordance with our invention.

As shown in FIG. 5, the developed hologram 50a is placed in position for illumination by a laser 23a or other monochromatic, coherent source at the frequency of the laser 23, through a collimated beam forming system comprising a lens 41a, pinhole mask 43a, and lens 49a corresponding in structure and function to correspondingly numbered elements in FIG. 1 but arranged on the opposite side of the hologram 50a.

Collimated light from the lens 49a passes through the hologram 50a and produces a reconstructed subject beam propagated down toward a convergent lens 87. The size of the beam is reduced, and the beam projected onto a mirror 89, from which it is reflected at 45 degrees. A three-dimensional image 1a of the object 1 is formed in space. A photographic plate 91 may be located in any desired plane in this image, as in the vicinity of the singularity image 3a. By that arrangement, an optical image in the selected plane of an opaque object can be recorded.

While we have described our invention with respect to the details of specific apparatus and procedural steps, many changes and variations will occur to those skilled in the art upon reading our description, and such can obviously be made without departing from the scope of our invention.

Having thus described our invention, what we claim is:

1. Apparatus for recording a holographic image of an acoustical field, comprising sound absorbent wall means forming a sound absorbent passage extending from an entrance end to an exit end along a longitudinal axis, said entrance end being closed by a closure member located in a plane normal to said axis, said exit end being closed by a transparent plate in a plane at 45 degrees to said axis to reflect sound passing from said entrance end to said exit end into said wall means for absorption thereby, a sound generator connected to said closure member and excitable to propagate a sound wave at constant frequency from said entrance end toward said exit end, a compliant diaphragm extending across said passage intermediate said ends and normal to said axis, said diaphragm having a light reflecting surface on the side toward said exit end, first light source means for directing a beam of monochromatic, coherent light into the exit end of said passage to reflect from said diaphragm, a photographic plate, means for directing light reflected from said diaphragm onto said plate, a second source of monochromatic, coherent light, means for directing light from said second source onto said plate, and frequency control means responsive to the frequency of light from said first and said second source and to the frequency of said sound generator to adjust the frequency of said first and second sources to differ by the frequency of said sound generator, whereby a latent holographic image is recorded on said plate.

2. The apparatus of claim 1, in which said passage is filled on both sides of said compliant diaphragm with a transparent fluid having a high specific acoustic impedance relative to air.

3. The apparatus of claim 2, in which one of said light source means comprises an optical laser having an electrically adjustable resonant optical frequency, and said frequency control means comprises means responsive to light from both light sources for producing an electrical signal in accordance with the difference in optical frequency of said light sources, means for producing an electrical signal in accordance with the acoustic frequency of said sound generator, means for comparing said electrical signals to produce an electrical control signal in accordance with their difference, and means for applying said control signal to said laser to adjust its resonant optical frequency to differ from the optical frequency of the other light source by the frequency of said sound generator.

4. The method of recording a holographic image of an acoustical field exciting a compliant diaphragm, comprising the steps of exciting the diaphragm at a frequency $f_a$, transmitting a beam of coherent monochromatic light at a frequency $f_0$ to the diaphragm, exposing a photographic plate to light reflected from the diaphragm, and simultaneously exposing the plate to monochromatic, coherent light at a frequency differing from $f_0$ by $f_a$.

5. The method of producing a hologram of the interior of an optical opaque, acoustically permeable region, comprising the steps of exciting the region with acoustic energy at a constant frequency, exposing a compliant diaphragm having an optically reflecting surface to sound energy emerging from said region, and making a hologram with a reference beam at an optical frequency $f_0$ and a subject beam reflected from the reflecting surface of said diaphragm, said subject beam being generated at an optical frequency differing from $f_0$ by the acoustic frequency exciting said region.

6. Acoustic recording apparatus, comprising a sound absorbent chamber, an optical window at one end of said chamber, a sound generator at the other end of said chamber for propagating a constant frequency sound wave toward said window, a compliant diaphragm placed across said chamber intermediate its ends, a transparent fluid of high specific acoustic impedance relative to air filling said chamber, a first source of monochromatic coherent light at a first frequency, means for directing light from said first source into said window onto said diaphragm, means for directing light reflecting from said diaphragm onto a predetermined plane region convenient for the location of a photographic plate, a second source of monochromatic coherent light at a second optical frequency differing from said first frequency by said acoustic frequency, and means for directing light from said second source onto said plane region, whereby a hologram may be made by placing a photographic plate in said plane region.

7. The apparatus of claim 6, in which said first and second sources of light comprises optical lasers, at least one of said lasers having a resonant frequency adjustable in response to an applied control signal, and further comprising frequency control means responsive to the acoustic frequency of said sound wave and the optical frequencies of said lasers for producing a control signal in accordance with the difference between said acoustic frequency and the absolute value of the difference between said optical frequencies, and means for applying said control signal to said adjustable frequency laser to adjust its frequency until the difference between said optical frequencies equals said acoustical frequency.

8. The apparatus of claim 7, in which said frequency control means comprises a photomultiplier tube, means for exposing said tube to light from both of said optical sources, and circuit means controlled by said tube for producing an electrical signal in accordance with the difference in the optical frequencies of said sources, electronic oscillator means for exciting said sound generator at a constant acoustic frequency, means controlled by said oscillator means for producing an electrical signal in accordance with said acoustic frequency, and comparator means responsive to said electrical signals for producing a control signal in accordance with the difference between said electrical signals.

No references cited.

JAMES J. GILL, *Primary Examiner.*
JOHN P. BEAUCHAMP, *Assistant Examiner.*

U.S. Cl. X.R.

181—.5; 340—5; 350—3.5